United States Patent [19]

Yamaji et al.

[11] 4,042,962
[45] Aug. 16, 1977

[54] COMPOSITE INFORMATION OPERATING METHOD AND APPARATUS

[75] Inventors: Keizo Yamaji, Tokyo; Akira Kurahashi, Yokohama, both of Japan

[73] Assignee: Canon Kabushiki Kaisha, Tokyo, Japan

[21] Appl. No.: 607,960

[22] Filed: Aug. 26, 1975

Related U.S. Application Data

[63] Continuation of Ser. No. 229,356, Feb. 25, 1972, abandoned.

[30] Foreign Application Priority Data

Mar. 1, 1971 Japan .................................. 46-10826
Mar. 5, 1971 Japan .................................. 46-12090
Mar. 6, 1971 Japan .................................. 46-12014

[51] Int. Cl.² .......................................... G03G 15/22
[52] U.S. Cl. ................... 358/300; 346/155; 96/1 R; 355/11
[58] Field of Search ............... 355/3 R, 8, 11, 17; 178/6.6 A, 7.2; 346/74 ES, 74 CR; 358/286, 300; 96/1 R

[56] References Cited

U.S. PATENT DOCUMENTS 3,597,071 7/1971 Jones ................................... 355/3 R
3,681,527 8/1972 Nishiyama et al. .......... 355/3 R UX

*Primary Examiner*—L. T. Hix
*Assistant Examiner*—Kenneth C. Hutchison
*Attorney, Agent, or Firm*—Fitzpatrick, Cella, Harper & Scinto

[57] ABSTRACT

A composition information operating apparatus and a method of recording composite information, the apparatus utilizing an endless rotatable photosensitive member, components for forming an electrostatic latent image of an original on the member, an electrostatic recording head and a separate charge detecting scanner and transmission head while the method includes the steps of first forming an electrostatic latent image of the original, then forming a further electrostatic latent image with the recording head and detecting and transmitting the electrostatic latent image on the photosensitive member with the charge detecting scanner and transmission head, the entire process being performed during a single rotation of the photosensitive member.

5 Claims, 2 Drawing Figures

COMPOSITE INFORMATION OPERATING METHOD AND APPARATUS

This is a continuation of application Ser. No. 229,356 filed Feb. 25, 1972, now abandoned.

BACKGROUND OF THE INVENTION

1. Field of the Invention

This invention relates to a composite information operating apparatus which comprises a combination of transmitter means, reception signal recording means and copying means and which essentially is a communication imaging system utilizing a copying-recording device. More particularly, the invention relates to a composite information operating apparatus in which a combination of transmitter means and reception signal recording means effects recording and copying of received information, a combination of copying means and transmitter means effects copying and transmission of information, and a combination of reception signal recording means and transmitter means effects copying, transmission and reception of information.

2. Description of the Prior Art

In the image communication system, combination of transmitter means, receiver means and copying means has never been conceived of, and much less, a system having reception, transmission and copying units integrated into a single apparatus has never existed nor occurred to mind.

Recent years have seen sharply increasing quantities of information and a greater diversity of information, and uniform distribution of such voluminous information over various parts of the world or countries or smaller units of area has become necessary.

Various methods and means of information operation have so far been studied or sought after, but the fact is that no method or means has been discovered which could meet the requirements such as the centralization and speed-up of information operation and appropriate distribution of processed information.

Along with the growing tendency of the information operating apparatus toward its exclusive use as such, a more universal or versatile usage of such system has been brought into re-consideration in connection with the desire to rationalize the office activities by efficient utilization of the system.

Further, the growing quantities of information have greatly increased the energy, materials and cost required to store such information and their simplification and economization is in urgent need.

In the conventional facsimile or other transmission system, the data or information to be transmitted has to be prepared in a predetermined form of transmission sheet, which in turn has to be exactly wrapped around a rotatable transmission drum. This has unavoidably led to the sheet-like formation of transmitted images.

Such a limited form available for transmitted images does not well cope with the present-day situations because nowadays information has so increased both in quantity and variety and because originals for the image transmission are actually often in the form of books or three-dimensional objects. When such three-dimensional objects should be transmitted by the conventional system, use must be made of a picture tube or a flying spot so as to scan the object images in a plane and this has led to an increased size and greater cost of the transmission means, and accordingly to a poor practicability.

SUMMARY OF THE INVENTION

It is therefore an object of the present invention to provide a composite information operating apparatus in which transmitter-receiver means is combined with copying means to thereby enable near-at-hand data or information to be recorded and transmitted and also enable remotely-located data or information to be received, copied and recorded, all through a very simple operation.

It is another object of the present invention to provide a composite information operating apparatus with which information as received may be quickly recorded on a recording medium by means of a recording head and, if desired, made into processed information or formed into a plurality of copies simultaneously.

It is still another object of the present invention to provide a composite information operating apparatus which can serve as an ordinary copier to provide copies of originals when there is no received information to be recorded and copied.

It is still another object of the present invention to provide a composite information operating apparatus in which a recording medium and processing means therefor are all used in common for various purposes such as copying, reception signal recording, transmission, etc.

It is yet another object of the present invention to provide a composte information operating apparatus in which a recording medium for reception signals may usually be the same type of paper as that used with ordinary copiers, thus reducing the cost of permanent records.

It is yet still another object of the present invention to provide a composite information operating apparatus which performs as copier, transmitter and receiver and at the same time enjoys a compact construction and simplified operation.

Thus, the system of the present invention can overcome the above-noted disadvantages peculiar to the prior art and deal with a greater deal of information. The present invention will be generally outlined hereunder. According to the present invention, information as received is quickly recorded on an intermediate recording medium (photosensitive medium), and if desired, formed into processed information or made into a plurality of copies simultaneously. When no received information is to be recorded and/or copied, the system of the present invention can serve as an ordinary copier which copies original images. In this way, the intermediate recording medium is used in common for the purposes of recording received information and copying original images. Most other steps or process are also used in common, and accordingly the recording medium for providing final copies may also be used in common. This leads to the solution to all the problems which have remained impossible to solve in the conventional communication system.

These merits are directly useful to improve the communication system for its greater versatility and to attain a greater ease in the operation of various means required to the system as well as a considerable reduction in the size of the entire system.

One feature of the present invention is that the intermediate recording medium and processing means therefor may be used in common for the purposes of copying and recording, as mentioned previously.

The recording medium conventionally employed for recording reception signals has compulsively been formed of a highly dielectric material having a great charge-holding capability, and conciderably expensive dielectric paper has usually been used for such purpose, but with rather great difficulties encountered in maintaining a sufficient charge-holding capability and in the adaptation of such medium for use with the apparatus, which difficulties has in turn led to difficulties in high-speed processing of information.

In contrast, the system of the present invention permits a recording medium to be also used repetitively as intermediate recording medium, and further permits the use of a highly dielectric recording material such as Mayler or the like, which in turn will greatly increase the service life of such recording medium, accompanied by remarkably enhanced technical and economical advantages, e.g. excellent image formation and lower cost.

As regards the transmiter means, it is such that an image corresponding to a variable type of information may be formed into an electrostatic latent image on the surface of a photosensitive medium as in the well-known type of electrophotographic copying apparatus, whereupon the electric charges carried by such latent image are detected for transmission by means of a charge detecting scanner.

If required, the electrostatic latent image may be developed, whereafter the developed image may be detected by the use of a light source and phototube as is done in the facsimile transmission. It is further possible to copy the information as transmitted, to thereby obtain a clear confirmation copy of the transmitted formation.

In a specific embodiment of the present invention, the recording medium employed in the composite information operating apparatus may be formed of such an inorganic or organic photoconductive material as conventionally used for the electrophotographic process, and may take the form of a rotatable member such as rotatable drum or endless belt.

The electrophotographic process utilized with the present invention may be either of the direct type in which image is directly copied and fixed on a photosensitive sheet or of the indirect or transfer type in which image is finally fixed on a transfer sheet, but the latter type is preferred by the present invention. The transfer type of electrophotographic process best suitable for use with the present invention is the well-known one as disclosed in U.S. Pat. No. 2,221,776 issued to Carlson, 1938, wherein a photosensitive medium comprising a layer of photoconductive material superposed on an electrically conductive back-up member is charged uniformly over the surface thereof, which surface is then illuminated by image light to form an electrostatic latent image thereon, whereafter such latent image is developed with the aid of toner particles and then fixed by heat or solvent or transferred to separate paper or the like for fixing. Another best applicable example of the transfer type electrophotographic process is the one as disclosed in U.S. Pat. No. 3,438,706 issued to the present assignnee, wherein a a photosensitive medium comprising an electrically chargeable dielectric layer superposed on a photoconductive layer is charged uniformly over the dielectric layer surface, whereafter image light and a charge of the opposite polarity or an AC corona discharge are simultaneously applied to that surface to thereby form thereon a electrostatic latent image corresponding to the light-and-shade pattern of the original image, and if required, the entire surface may be exposed to light to enhance the contrast of the formed electrostatic latent image, whereafter the latent image is passed through the steps of development, transfer and fixing to provide a final copy image. Other various electrophotographic processes may also be applicable to the present invention.

BRIEF DESCRIPTION OF THE DRAWINGS

The invention will be fully understood from the following detailed description thereof taken in conjunction with the accompanying drawings, in which.

DESCRIPTION OF THE PREFERRED EMBODIMENTS

Figure 1:
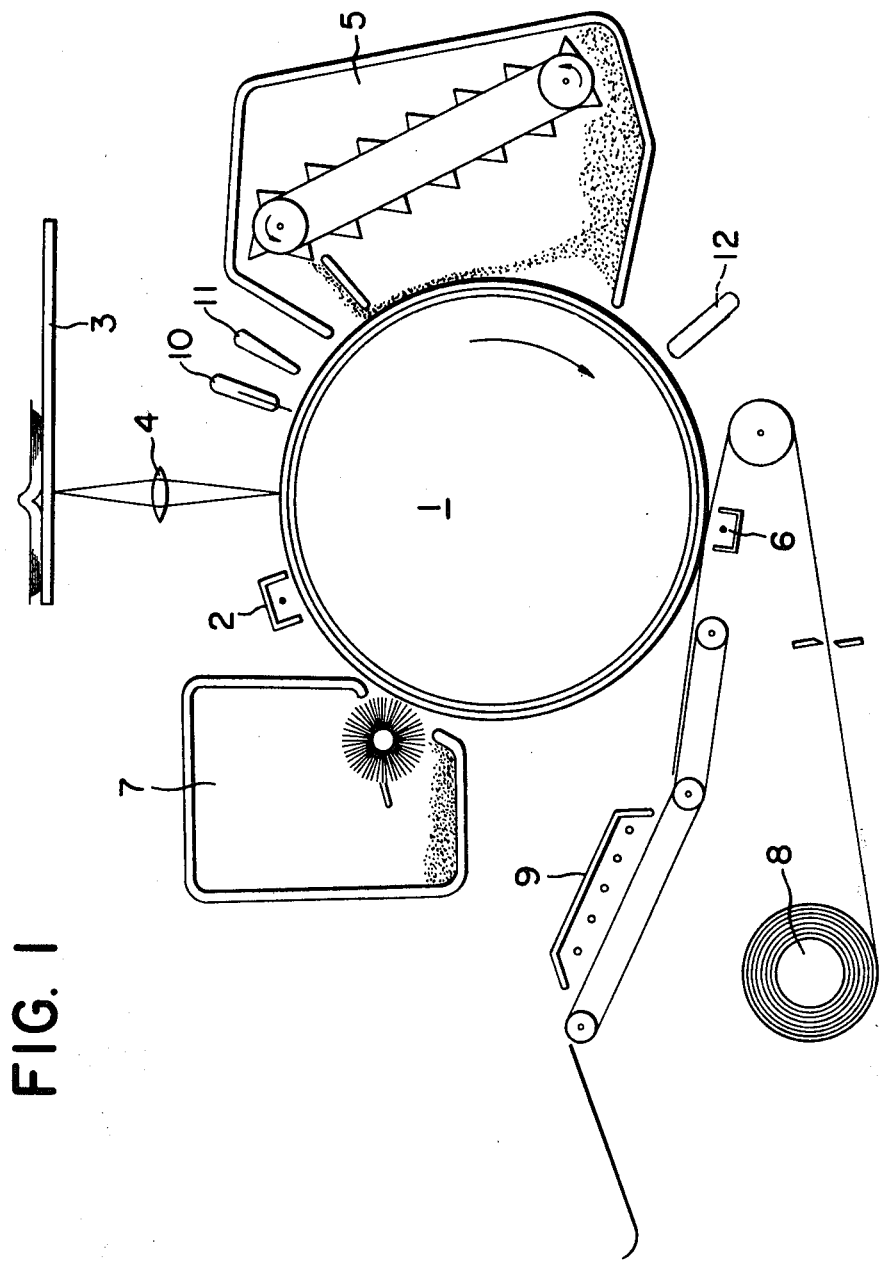
FIG. 1 is a schematic view illustrating the construction of a composite information operating apparatus according to the present invention.

Description will first be made of the electrophotographic process incorporated in the system shown in FIG. 1.

As shown, the composite information operating apparatus comprises an intermediate recording medium such as rotatable drum 1, a charger means 2, an original carriage 3 for projecting an original image on the surface of the rotatable drum 1, an optical apparatus such as lens 4, a developing means 5, a transfer means 6, a cleaning means 7, a transfer paper feeder means 8, and a fixing means 9. The apparatus further includes a recorder means such as reception signal recording head 10, an information transmitter means such as electrostatic latent image detection-transmission head 11 and developed image detection-transmission head 12 which may be used simultaneously or alternatively with head 11, and if required, may further include a discharging means.

The composite information operating apparatus may perform the following functions:
1. the process of copying an original on the carriage 3 through the steps of charging, exposure (to image light), development, transfer and cleaning (fixing);
2. the process of recording the information as received by the reception signal recording head 10, through the steps of discharging, recordng (by latent image recording head), development, transfer and cleaning (fixing); and
3. the process of transmitting the original image from the carriage 3 through the steps of:
   a. electrostatic latent image formation, latent image detection (transmission), development, transfer, and cleaning (fixing); or
   b. electrostatic latent image formation, development, dust image detection (transmission, transfer, and cleaning (fixing).

The reception signal recording process and the original image copying process, and sometimes the transmission process, share at least the steps of development transfer and fixing (cleaning). The recording process may be accomplished either by utilizing a photo-recording head such as luminous diode, CRT or the like or by utilized an electrostatic recording technique, which will herein be described as an example.

In the electrostatic recording process, certain cooperative relations will arise between the various steps involved in the copying process, dependng on how the discharging step is carried out.

There are two methods of discharging, i.e. one which utilizes the original image copying process and one which uitlizes a specific process instead of utilizing part of the copying process.

The former discharging method is that which utilizes the steps of charging and exposure as involved in the copying process, although the exposure step must be such that the surface of the original to be copied has a reflective surface to achieve the same effect as that attained by overall exposure. Such a reflective surface may usually be provided by a white cover for keeping the original.

The specific process utilized by the latter discharging method may comprise the following alternative steps:
1. overall exposure;
2. charging and overall exposure; or
3. simultaneous charging and overall exposure.

The overall exposure may be accomplished by an auxiliary lamp exclusively intended for such purpose, and charging may be accomplished by a charger means. For the simultaneous charging and overall exposure, means is provided for such purpose.

In these three alternative cases, the step of exposure to the original image light as involved in the original copying process is eliminated, and the charging means for the copying process need not be used in the cases under items (1) and (3) above.

With regard to the transmission process, the electrostatic latent image detecting head may be an electrometer or the like across whose head may run lines of electric force emitted from the electrostatic latent image on the surface of a photosensitive medium, thereby detecting the latent image in accordance with the capacitor variation resulting therefrom. Most preferably, the tip end of the head may have a diameter less than 50 microns and may be spaced apart less than 50 microns from the photosensitive medium.

A specific embodiment of the present invention will now be described in detail. To carry out the original image copying process, the rotatable drum 1 is electrically charged by the charger means 2 and an original image is projected on the surface of the rotatable drum 1 through the lens apparatus 4, to thereby form an electrostatic latent image. The latent image is visualized by the developng means 5 and the dust image is then transferred from the drum surface to the surface of a transfer paper web fed from the paper feeder means 8. The transfer paper web has the image thereon fixed by the fixing means 9 and is removed as a final copy.

The recording medium, i.e. the rotatable drum 1 is cleaned in preparation for a subsequent copying cycle.

To obtain plural copies of the same original image, the above-described process may be correspondingly repeated with the steps of charging and exposure no longer required for the second and further copying cycles, but with the steps of development and transfer only repeated without destroying the latent image on the rotatable drum surface during the image transfer.

The cleaning step need not be effected for each repeated cycle but may be effected for the final copying cycle alone.

For the reception signal recording process to be effected, the exposure to the original image through the optical apparatus as required in the copying process may be eliminated, and if an electrostatic recording head is employed instead of a photo-recording head such as luminous diode or CRT, the charging step is also unnecessary. The direct formation of a latent image using an electrostatic recording head will be described herein as an example.

Residual charges on the rotatable drum surface are removed by the use of:
1. the charger means 2 and optical apparatus 4 as used in the copying process;
2. the charger means 2 and auxiliary lamp (not shown); or
3. the simultaneous charging and exposure means (not shown).

Thence, an electrostatic charge pattern of signals is formed directly on the surface of the rotatable drum 1 by means of the head 10 for recording a telegraphic image. Where the transmission process for the information to be transmitted is to be effected, either the latent image detection may take place during the copying process after the latent image formation but before its development, or the visible image detection may take place after the development as in the conventional method.

Thus, a copy of the received information or of the transmitted information may then be obtained through development and transfer on the same transfer paper as used in the copying process.

In either of these cases, the visualized image may thereafter be transferred if desired, thereby providing a confirmation copy of the transmitted image. If desired, numerous similar copies may be obtained.

The transfer paper with an image transferred thereto may be severed into a length by a cutter (not shown) in accordance with the type of the telegraphic image (or the amount of information).

In the communication apparatus wherein the amount of telegraphic image is predetermined, the transfer paper may be in the form of sheet instead of roll.

When the amount of information corresponding to a single telegraphic image is within the peripheral length of the rotatable drum 1, a number of copies may be quickly produced through the repetition of development and transfer steps as described with respect to the copying process.

In such a copying-recording apparatus wherein the original image copying process and the reception signal recording process share the essential steps in common, there is an advantage that copies of the same quality can be obtained on a common web of transfer paper, as well as a great advantage that the telegraphic image can be rapidly copied into a plurality of duplicates.

Figure 2:
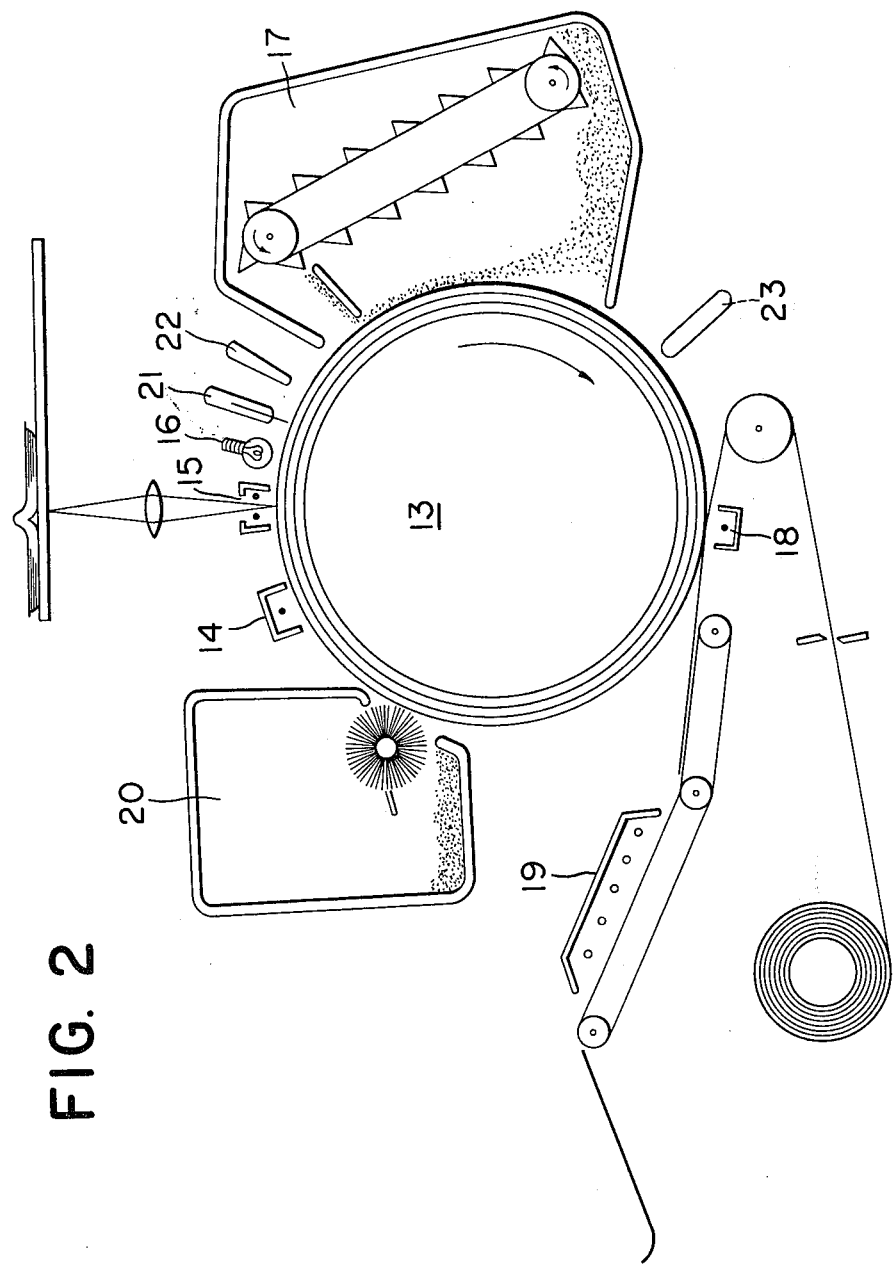
FIG. 2 is a schematic view illustrating the construction of a composite information operating apparatus which utilizes an electrophotographic process of a different type from that used in FIG. 1.

Referring now to FIG. 2, there is shown another form of the present invention which is based on a different type of electrophotographic process. The composite information operating apparatus shown there comprises an intermediate recording medium such as rotatable drum 13, a primary charger 14, a simultaneous exposure and discharging means 15, an overall exposure means 16 which may be provided if required, a developing means 17, a transfer means 18, a fixing means 19 and a cleaning means 20. The apparatus further includes a recording means such as reception signal recording head 21, an information transmitter means such as electrostatic latent image detection-transmission head 22 and developed image detection head 23 which may be used simultaneously or alternatively with head 22, and if required, a discharging means.

Again in this embodiment, as in the previous one, the copying process and the recording and transmission processes are variable depending on whether or not the discharging process is present, and the recording process is only variable with the difference of the discharging method. The present embodiment is characterized in that it employs an intermediate recording medium 13 which comprises three layers as described already. The outermost surface of the recording medium is of highly dielectric material, which is most suitable for providing an electrostatic record highly capable of holding electrostatic charges.

In such an electrophotographic apparatus, the original image recording process comprises the steps of primary charging, simultaneous application of image light and charge of the opposite polarity to the primary charge or AC charge, overall exposure, development, transfer and fixing (cleaning).

The reception signal recording process comprises the steps of discharging, recording (by recording head), developement, transfer and fixing (cleaning), and this is the same as in the previous embodiment.

The discharging step in this recording process may be accomplished through the following alternative combinations of steps:

1. primary charging, and AC discharging simultaneously with overall exposure (by utilizing an original-keep cover with a uniformly white surface;
2. primary charging, and AC discharging simultaneously with overall exposure (by utilizing an auxiliary lamp provided in addition to the optical system used for the copying process);
3. primary charging, AC discharging simultaneously with exposure to image light, and overall exposure simultaneously with AC discharging;
4. overall exposure simultaneously with AC discharging; or
5. exposure to image light simultaneously with or reversely to AC discharging.

In the cases under items (1), (2) and (3) above, the various steps as involved during the copying process may take place. Further, in the cases under items (2) and (3), either an auxiliary lamp is additionally incorporated in the optical apparatus but normally is not used during the copying process, or an AC discharging means having an auxiliary lamp is provided. In the cases under items (4) and (5) above, the primary charger device is inoperative.

Further discharging methods comprising a combination of primary charging and subsequent charging of the opposite polarity simultaneously with overall exposure would be readily apparent to those skilled in the art, but these method need not be described.

It will thus be noted that the discharging step may be effected through one of various combinations of primary charging, AC discharging of the opposite polarity to the primary charging, and overall exposure, prior to the recording process being effected by the recording head.

In the above-described copying-recording apparatus using the electrophotographic process, the recording head may be a series of styli usually available for facsimile or the like. Alternatively, a transmission rope known in the transmission system may be used with the recording head.

The composite information operating apparatus of the present invention may be automatically or manually changed over between various modes of operation, i.e. the original image copying mode, the received information recording mode and the information transmitting mode. Upon such a change-over the related parts alone of the system are operated while unnecessary parts are inoperative.

For example, depression of COPY button makes an "OFF" line which disconnects the recording means, and depression of RECORD button makes an "ON" line which operates the recording means to record on the recording medium the information as received from facsimile or electronic computer. Depression of RECORD-COPY button permits the received information to be recorded and copied immediately. Also, depression of TRANSMIT button permits transmission and if required, copying of information.

In this manner, information can automatically be received, recorded, transmitted and/or copied, as desired.

Further, if the order of preference between the "copy" and "record" modes of the copying-recording means is set to the "record" mode, for instance, the copying-recording means will automatically change over to the "record" mode when transmission is initiated even if the copying-recording means is then effecting its copying operation, and thereafter at the end of the recording operation, a coyping operation will follow in accordance with a signal representing such ending. Conversely, the preference of order may be given to the "copy" mode, of course.

The availability of such "interstitial" means forms another advantage of the composite information operating apparatus according to the present invention.

Furthermore, copying and recording or transmission and copying may be synchronized together so that the recorded information may be taken out in the form of processed information. For example, information as transmitted may be recorded together with a title or a particular consecutive number or the like, as desired by the reception side, and in addition to received information, answering information may be transmitted and copied at the same time. These add to the feature of the present invention.

In the embodiment of FIG. 1, the system has been described as comprising a paper feeder unit including all of the copying means, receiver means and transmitter means, whereas a unit only including copying means and receiver means and a unit only including copying means and transmitter means would be able to sufficiently serve their respective intended purposes. The detailed constructions and operations of these two units are omitted herein, because they may readily be provided by eliminating the transmitter means and receiver means from FIGS. 1 and 2, respectively.

As will be appreciated from the foregoing detailed explanation, the composite information operating apparatus of the present invention is highly excellent both in performance and operation as it readily enables transmission and copying of information only if an original of such information is simply placed on the original carriage. Moreover, the original of information to be treated by the present apparatus is not limited to the form of such a transmission sheet as has conventionally been used in the facsimile technique, but three-dimensional originals such as books or other suitable objects may also be selected for treatment. Furthermore, the present invention can read out electrostatic latent images, which may then be converted into original signals representing the information to be transmitted. In addition, no specific optical system is required for the transmission of information but the optical system existing for the copying process may be directly used for the transmission process as well, and this is useful to enhance the compactness and simplification of the entire system. A further advantage is that the step of converting optical images into electrical signals may be eliminated and electrical signals may be directly utilized as reply signals, which serves to reduce the operational mistakes probable to occur during the transmission.

According to the apparatus of the present invention, received information and/or information on the part of reception side may be copied (in combination) as desired, and such information may be directly transmitted. Still another advantage of the present invention is that the information as transmitted may be copied on transfer paper by utilization of the same electrostatic latent image, thus providing a confirmation copy which may be readily checked up with the original information, and that a number of such copies can be obtained if desired.

We claim:

1. A method of recording composition information on an endless photosensitive member as said member is rotated, wherein said member is incorporated into a device further including means for charging said member, means for supporting an original to be copied, optical means between the supporting means and said member for projecting a light image of the original onto said member, an electrostatic recording head, and a separate charge detecting scanner and transmission head, said method comprising the steps of first uniformly charging a portion of said member with said charging means, then forming an electrostatic latent image of the original on said portion with said optical means, then forming a further electrostatic latent image on said portion from information received by said recording head, and detecting and transmitting the electrostatic latent images formed on said portion with said charge detecting scanner and transmission head, wherein all of the method stops are completed during a single rotation of said member.

2. A method according to claim 1, wherein said device further includes means for developing a latent image and further including the step of developing the electrostatic latent images formed on said portion with said developing means once said latent images have been detected and transmitted.

3. A method according to claim 1, wherein said endless photosensitive member includes a dielectric layer, a photoconductive layer and an electrically conductive base layer, further comprising the step of applying a corona discharge to a portion of the dielectric layer while simultaneously forming said electrostatic latent image of said original on said portion of said member with the optical means.

4. A method of recording composite information on an endless photosensitive member as said member is rotated, wherein said member in incorporated into a device further including means for charging said member, means for supporting an original to be copied, optical means between the supporting means and said member for projecting a light image of the original onto said member, an electrostatic recording head, means for developing a latent image, and a separate charge detecting scanner and transmission head, said method comprising the steps of first uniformly charging a portion of said member with said charging means, then forming an electrostatic latent image of the original on said portion with said optical means, then forming a further electrostatic latent image on said portion from information received by said recording head, then developing the electrostatic latent images formed on said portion with said developing means and then detecting and transmitting the developed images on said portion with said charge detecting scanner and transmission head, wherein all of the method steps are completed during a single rotation of said member.

5. A method according to claim 4, wherein said endless photosensitive member includes a dielectric layer, a photoconductive layer and an electrically conductive base layer, further comprising the step of applying a corona discharge to a portion of the dielectric layer while simultaneously forming said electrostatic latent image of said original on said portion of said member with the optical means.

* * * * *